Sept. 5, 1967

J. A. GEE 3,339,960

QUICK RELEASE CLAMPING MECHANISM

Filed Jan. 24, 1966

INVENTOR
J.A. GEE

BY [signature]

ATTORNEY

United States Patent Office 3,339,960

Patented Sept. 5, 1967

3,339,960

QUICK RELEASE CLAMPING MECHANISM

James A. Gee, Marion, Ind., assignor to Western Electric Company, Incorporated, New York, N.Y., a corporation of New York Filed Jan. 24, 1966, Ser. No. 522,426
6 Claims. (Cl. 292—256)

This invention relates to a quick release clamping mechanism and, more particularly, to a quick release clamping mechanism for releasably holding an object on a surface of a housing having openings therethrough. It is an object of this invention to provide an improved mechanism of such character.

In the assembly of many articles of manufacture it is necessary to secure a removable object, such as a cover plate, on a surface of a housing. An example of such an article of manufacture is a CALL DIRECTOR telephone set wherein a plastic cover plate is removably mounted on an upwardly facing surface of a housing containing the dialing and line switching mechanisms of the telephone set. Actuating devices for the dial and line switching mechanisms extend upwardly through a principal opening in the telephone housing and through associated openings in the cover plate to a position above the cover plate which is accessible to one desiring to operate the telephone set.

The cover plate for such a telephone set must be removably secured to the housing of the set so that, for example, either repair of the internal mechanisms of the set may be effectuated or a change may be made in line designations carried by or imprinted on the cover plate. When in place, the cover plate must be securely held in a proper position with respect to the telephone housing so that normal use of the set will not dislodge the cover plate. However, when it is desired to remove the cover plate, the removal thereof must be a simple operation.

Accordingly, it is another object of this invention to provide a quick release clamping mechanism for holding an object on the surface of a housing between a pair of spaced members, the mechanism having a portion thereof movable so as to increase the spacing between the members thereby to allow easy removal of the object from the surface of the housing.

It is still another object of this invention to provide a quick release clamping mechanism which includes a bezel edge clamping member movable relatively away from a fixed stop so that a cover plate held between the bezel edge and the stop may be easily removed from a housing upon which the mechanism is mounted.

It is a further object of this invention to provide a quick release clamping mechanism for slidably mounting an object on the surface of a housing, which mechanism is simple in operation, effective in use, and relatively inexpensive to construct.

In accordance with a preferred embodiment of the mechanism of this invention, an object is releasably held on the surface of a housing between a stop member affixed to the housing and a clamping member having at least one clamping edge. The clamping member also has two spaced appendages which extend downwardly through at least one opening in the housing, one surface of each of the appendages defining a cam surface. A spring is provided which has at least two elongated, resilient legs each of which is in continuous engagement with and deflected by the cam surface of an associated one of the appendages, each of the resilient legs being deflected at a progressively greater angle when the associated, engaged appendage is moved in a direction away from the stop member. Further, as the legs of the springs are being deflected, the legs establish a biasing force on each of the associated appendages tending to move them, and therefore the clamping member, in a selected direction toward the stop member. The movement of the elongated legs relative to the housing is restricted to only resilient deflection.

In operation of the mechanism, as the clamping member and the appendages attached thereto are moved in a direction away from the stop member to allow insertion of the object between the clamping edge of the clamping member and the stop member, the elongated legs of the spring are deflected sufficiently so that the resulting force being applied by the legs on the appendages in the selected direction results in the object being firmly held between the clamping edge and the stop member after insertion of the object therebetween.

This invention, together with further objects and advantages thereof, will best be understood by reference to the following description taken in conjunction with the accompanying drawings in which.

Figure 1:
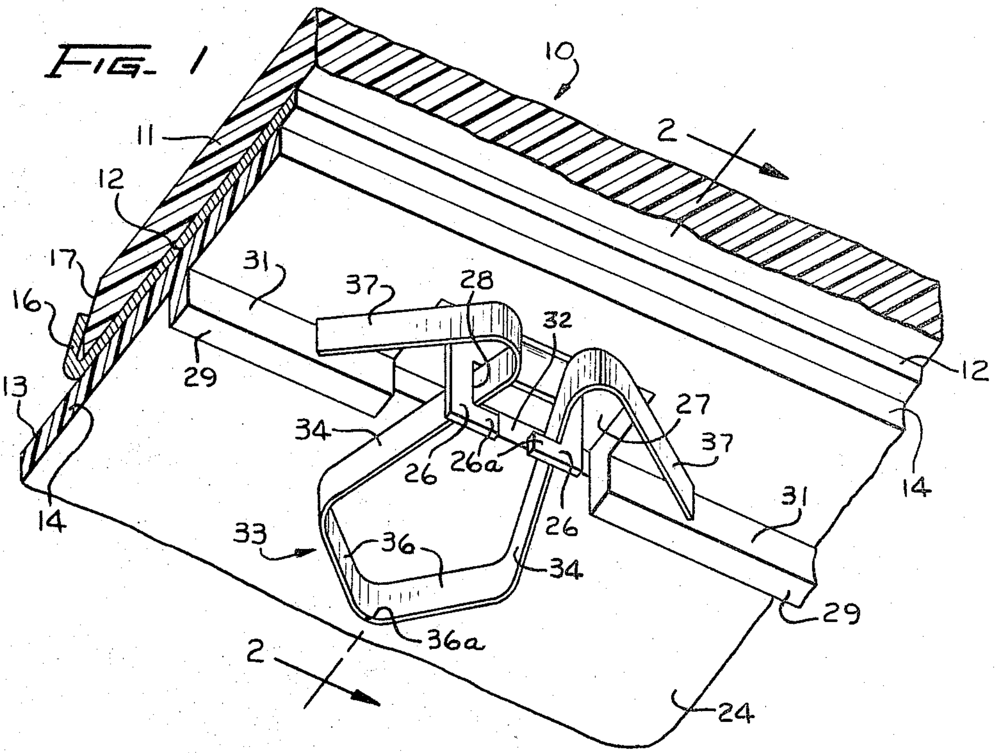
FIG. 1 is an exploded, isometric view of a preferred embodiment of the quick release clamping mechanism of this invention as viewed from the underside of a housing.

In FIG. 1 of the associated drawings, a preferred embodiment of the quick release clamping mechanism 10 is depicted which incorporates therein the principles and teachings of this invention. The preferred embodiment of the mechanism is shown and described as utilized with a clamping member 12 having a bezel edge 16 for removably securing a cover plate 11 on the housing 14 of a CALL DIRECTOR telephone set. However, as will be apparent to one skilled in the art, the quick release clamping mechanism of this invention may be utilized in various applications wherein it is desired to both hold an object on the surface of a housing and also permit easy removal of the object from the surface when such is desired.

Figure 2:
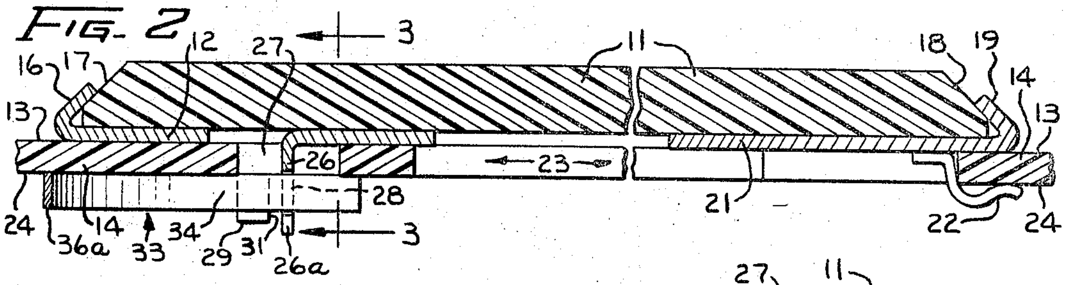
FIG. 2 is a side elevational view taken along line 2—2 of FIG. 1 showing in cross section the preferred embodiment of this invention and, in addition thereto, also showing a fixed stop.

With specific reference to FIGS. 1 and 2, the quick release clamping mechanism of this invention includes a clamping member 12 mounted on and slidable over an upper surface 13 of a housing 14. The bezel edge 16 of the clamping member 12 is designed to engage a first edge 17 of the cover plate 11 in such a manner that when the clamping member 12 is biased in a selected direction with respect to the upper surface 13 of the housing 14, a second edge 18 of the cover plate is forced against a bezel edge 19 of a mounting member 21 (see FIG. 2). The mounting member 21 has a spring clip portion 22 thereof which extends through a principal opening 23 (see FIG. 2) in the housing 14 to engage a lower surface 24 of the housing thereby to affix the member 21 to the housing.

The cover plate 11 is utilized to cover the principal opening 23 in the telephone housing 14. Actuating devices (not shown) extend upwardly through the opening 23 and through associated openings (not shown) in the cover plate 11 to a position above the cover plate which is accessible to one desiring to operate the telephone set.

In accordance with the principles of this invention, as detailed in the preferred embodiment thereof, a pair of spaced laterally aligned appendages 26 extend downwardly from a bottom surface of and are an integral part of the clamping member 12. When the member 12 is placed on the housing's upper surface 13, the appendages 26 extend through a rectangular opening 27 in the housing 14 and generally perpendicularly beyond the housing's lower surface 24. Each of the appendages 26 has a cam surface 28 thereon (see FIG. 3) which, in the preferred embodiment of the invention, are in a mutually opposed, facing relationship. Each of the appendages 26 also has a projecting portion 26*a* thereof, the purpose of which will be described hereinafter.

In accordance with the principles and teachings of this invention, as described in conjunction with the preferred embodiment thereof, a bent, wire spring, designated generally by the numeral 33, is positioned such that two spaced, resilient, elongated legs 34 thereof each engage the cam surface 28 on an associated one of the appendages 26.

The wire spring 33 (see FIG. 1) is formed symmetrically about a centerline and has on each side of the centerline an initial leg 36, the elongated leg 34 and a free-end leg 37. Each initial leg 36 extends outwardly from a common junction point 36*a* on the centerline at an acute angle with respect to the centerline. Each elongated leg 34 extends from an associated initial leg 36 inwardly toward, but not to, the centerline. Each free-end leg 37 extends backwardly from an associated elongated leg 34, away from the centerline and essentially perpendicularly toward a plane which would define an extension of the corresponding initial leg 36.

The elongated legs 34 of the wire spring 33, when in their assembled position as depicted in FIG. 1, are displaced laterally toward one another from a position they would normally assume in a free or noncompressed state. Each of the elongated legs 34 are received above a different projecting portion 26*a* of the two appendages 26, and biases against the cam surface 28 of an associated one of the appendages 26.

Figures 3, 4, 5:
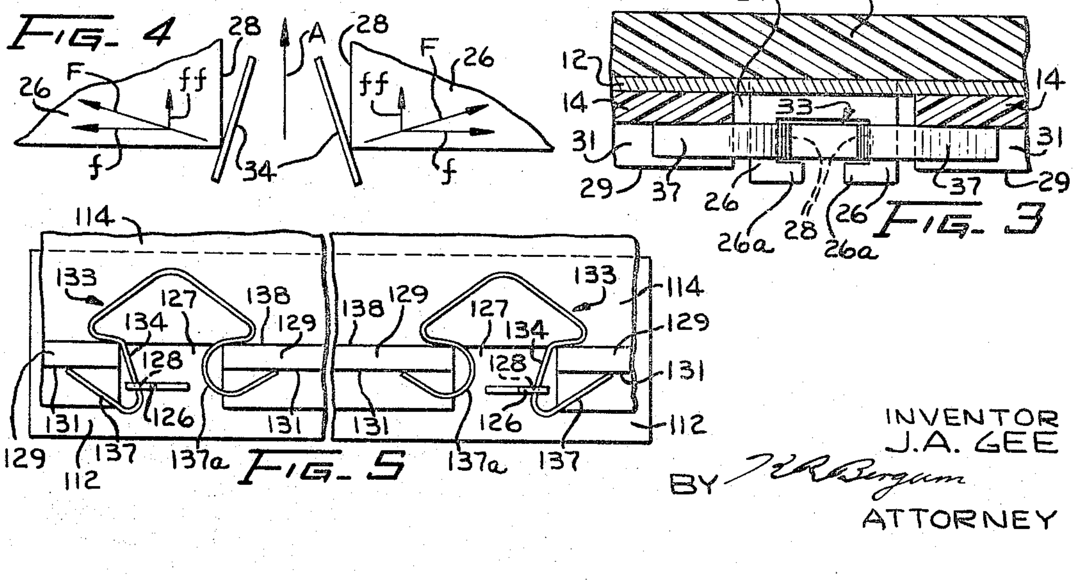
FIG. 3 is an elevational view taken along line 3—3 of FIG. 2 showing in greater detail the cooperation of the elements of the mechanism of this invention.
FIG. 4 is a schematic force diagram illustrating in part, the principles of this invention.
FIG. 5 is a bottom, plan view of an alternate form of the mechanism of this invention.

Since the elongated legs 34 of the spring 33 are both in a compressed state and engage the cam surfaces 28 at an angle, each elongated leg 34 applies a biasing force against the associated, engaged cam surface 28 generally in the direction of arrow F of FIG. 4. The force F is resolvable into two components indicated by the arrows marked *f* and *ff* in FIG. 4. The two forces in the *ff* direction tend to move the appendages 26, and thus the clamping member 12, along a selected axis in the direction of arrow A of FIG. 4. The two forces marked *f* are essentially in opposite directions, and their net effect on the appendages 26 is to keep the appendages generally centered about the selected axis.

The free-end legs 37 of the spring 33 (see FIG. 1) extend backwardly from the associated elongated legs 34 to partially encircle associated appendages 26. The terminating ends of the free-end legs 37 engage respective surfaces 31 of different portions of a sectioned ridge 29. This sectioned ridge extends downwardly from the lower surface 24 of the housing 14 and has portions thereof on opposed sides of the rectangular opening in the housing 14. The engagement of the surfaces 31 by the free-end legs 37 restricts the movement of the spring 33 with respect to the housing 14 to only resilient deflection of the various leg portions thereof. This type of engagement of the free-end legs 37 and the surfaces 31, in cooperation with the retention of the opening 33 in the assembled position by the projecting portions 26*a* of the appendages 26, also permits a free flexing or resilient bending of the elongated legs 34 relatively toward and away from one another as the cam surfaces 28 of the appendages 26 are moved along the legs 34 to various portions thereof. During the resilient bending of the elongated legs, the terminating ends of the free-end legs 37 of the spring 33 are drawn back and forth along their associated surfaces 31 of the ridge portions 29, and in so doing insure that the spring remains properly oriented relative to the ridge 29.

With specific reference to FIGS. 1 and 2, it may be seen that if the selected direction for application of a biasing force by the spring 33 on the clamping member 12 is chosen so as to be perpendicular toward the bezel edge 19 of the mounting clip 21, the cover plate 11 may be easily and quickly secured between the bezel edge 16 of the clamping member 12 and the bezel edge 19 of the mounting member 21.

The mounting of the cover plate 11 between the two bezel edges is effectuated by moving the clamping member 12, and thus the bezel edge 16 thereof, to the left as viewed in FIG. 2. This movement of the clamping member 12 draws the cam surfaces 28 of the appendages 26 along the elongated legs 34 of the spring 33 so as to further compress the legs 34 by moving them laterally toward one another.

The cover plate is then positioned such that the second edge 18 thereof is in engagement with the bezel edge 19 of the mounting member 21, and the first edge 17 thereof is in alignment with, but spaced from, the bezel edge 16 of the clamping member 12. The clamping member 12 is thereafter released and the force exerted by the elongated legs 34 of the spring 33 is applied to the appendages 26 associated with the clamping member 12, thereby causing the clamping member to move in the selected direction (to the right in FIG. 2) toward the mounting member 21. The bezel edge 16 of the clamping member 12 is thus drawn into firm engagement with the first edge 17 of the cover plate 11 whereby the cover plate is securely held between the opposed bezel edges 16 and 19.

To remove the cover plate 11 from the housing 14, the force exerted by the spring 33 is overcome by moving the bezel edge 16 of the clamping member 12 to the left as viewed in FIG. 2. This movement releases the gripping contact between the bezel edge 16 and the first edge 17 of the cover plate 11 whereby the cover plate may be easily removed from the housing 14.

There has been disclosed herein a preferred embodiment of a quick release clamping mechanism for releasably holding an object on a surface of a housing. In the preferred embodiment of the mechanism, a movable clamping member has as an integral part therewith a bezel edge which, in cooperation with a mounting member having a bezel edge, releasably retains a cover plate on a telephone housing.

In FIG. 5 of the associated drawings, there is depicted an alternate embodiment of the quick release clamping mechanism of this invention.

In the alternate embodiment, a clamping member 112 is slidably mounted on and biased in a selected direction with respect to a housing 114. A pair of appendages 126 are associated with and extend from the clamping member 112 through and perpendicularly beyond respective ones of a pair of openings 127 in the housing 114.

A pair of bent wire springs, generally designated by the numeral 133, are employed in the alternate embodiment of the invention. Each spring 133 has a single resilient, elongated leg 134 for engaging a cam surface 128 of an associated appendage 126, a free-end leg 137 and a generally semicircular, spring securing leg 137*a*. The free-end leg 137 of each spring extends from the elongated leg 134 to partially encircle the associated appendage 126 and then engage, at its free or terminating end, a front surface 131 on a portion of a sectioned ridge 129 which extends downwardly from the housing 114. The spring securing leg 137*a* of each spring has a portion thereof which engages a back surface 138 and a portion thereof which engages the front surface 131 of a portion of the sectioned ridge 129 thereby to retain the spring 133 in a fixed position. With the spring securing leg 137*a* of the spring 133 making contact with both the front and back surfaces of the same portion of the sectioned ridge 129, the spring is firmly held by the ridge 129 and insures that the clamping member 112 is movable only along a straight line.

As is apparent from FIG. 5, the pair of springs 133 are mounted such that the elongated leg 134 of each spring engages its associated appendage 126 in a manner such that a biasing force F is applied to the appendage in the same manner as described before in conjunction with FIG. 4 for the preferred embodiment of this invention. In the alternate embodiment this biasing force would tend to move the clamping member 112 in a downwardly direction, in the plane of the drawing, as viewed in FIG. 5.

There has been shown, in the alternate embodiment, a quick release clamping mechanism for releasably holding an object on a surface of a housing. The mechanism disclosed is simple in operation, efficient in use and relatively inexpensive to utilize.

While two embodiments of the invention have been disclosed herein, many modifications will be apparent. For example, in the first embodiment of the invention depicted in FIG. 1 of the drawings, the spring 33 may be secured to the housing 14 at the point 36a where the two initial legs 36 of the spring are joined. If such is the case, the free-end legs 37 of the spring 33 and the sectioned ridge 29 could be eliminated. Moreover, the internal edge of the opening 27, opposite the edge 32 of the opening (FIG. 1), could be formed to provide a stop which limits the travel of the clamping member 12 in one direction, preferably while the legs 34 of the spring 33 are still under compression. Therefore, it is intended that the invention be interpreted as including all modifications which fall within the true spirit and scope thereof.

What is claimed is:

1. A quick release clamping mechanism for releasably holding an object on a surface of a housing having openings therethrough, the mechanism comprising:

a clamping member having at least one clamping edge and two spaced appendages extending through at least one opening in the housing when said member rests on the surface of the housing, one surface of each of said appendages defining a cam surface;

stop means affixed to the housing in spaced relationship with respect to said clamping edge of said member;

spring means having at least two elongated, resilient legs each of which is in continuous engagement with and deflected by said cam surface of an associated one of said appendages, each of said resilient legs both being deflected at a progressively greater angle when said associated, engaged appendage is moved in a direction away from said stop means, and establishing a biasing force tending to move the engaged appendage in a selected direction toward said stop means to facilitate said clamping member and said stop means releasably holding an object therebetween; and means for restricting movement of said elongated legs of said spring means relative to said housing to only resilient deflection.

2. A quick release clamping mechanism in accordance with claim 1, wherein said cam surfaces of said appendages associated with said clamping members are in a mutually opposed, facing relationship:

wherein said spring means is a wire spring formed symmetrically about a centerline so as to have on each side of the centerline in addition to said elongated leg, both an initial leg and a free-end leg, each of said initial legs extending from a common junction point outwardly from the centerline at an acute angle with respect thereto, each of said elongated legs extending from an associated one of said initial legs inwardly toward, but not to, the centerline, and each of said free-end legs extending from an associated one of said elongated legs both away from said centerline and toward a plane which would define an extension of an associated one of said initial legs; and wherein said means for restricting movement of said spring means comprises a sectioned ridge extending both downwardly from the underside of the housing and along a line parallel to a line through said appendages, said ridge being laterally offset from said appendages a distance sufficient for the side of said ridge adjacent an associated terminating end of one of the free-end legs of said spring means to make contact therewith.

3. A quick release clamping mechanism in accordance with claim 2, wherein both said clamping edge of said clamping member and said stop means affixed to the housing are in the form of a bezel edge.

4. A quick release clamping mechanism for releasably holding an object on a surface of a housing having an opening therethrough, the mechanism comprising:

a clamping member having at least one clamping edge and two spaced appendages extending through the opening in the housing when said member rests on the surface of the housing, mutually opposed, facing surfaces on respective ones of said appendages defining cam surfaces;

stop means affixed to the housing in spaced relationship with respect to said clamping edge of said member;

a spring having two elongated, resilient legs located symmetrically about a centerline of said spring, each of said legs being in continuous engagement with and deflected by said cam surface of an associated one of said appendages, each of said resilient legs both being deflected inwardly toward the centerline of said spring when said associated, engaged appendage is moved in a direction away from said stop means, and establishing a biasing force tending to move the engaged appendage in a selected direction toward said stop means; and means for restricting movement of said elongated legs of said spring relative to said housing to only resilient deflection;

whereby as said clamping member and said appendages attached thereto are moved in the direction away from said stop means to allow insertion of the object between said clamping edge and said stop means, said elongated legs are deflected sufficiently so that the resulting force being applied by said legs on said appendages in the selected direction results in the object being firmly held between said clamping edge and said stop means after the object is inserted therebetween.

5. A quick release clamping mechanism for releasably holding an object on the surface of a housing having openings therethrough, the mechanism comprising:

a clamping member having at least one clamping edge and two spaced appendages extending through two different openings in the housing when said member rests on the surface of the housing, one surface of each of said appendages defining a cam surface;

stop means affixed to the housing in a spaced relationship with respect to said clamping edge of said member;

spring means having at least two independent, elongated, resilient legs each of which is in continuous engagement with and deflected by a different cam surface of an associated one of said appendages, each of said resilient legs both being deflected at a progressively greater angle when said associated, engaged appendage is moved in a direction away from said stop means and establishing a biasing force tending to move the engaged appendage in a selected direction toward said stop means; and means for restricting movement of said independent, elongated legs of said spring means relative to said housing to only resilient deflection;

whereby as said clamping member and said appendages attached thereto are moved in a direction away from said stop means to allow insertion of the object between said clamping edge and said stop means, said independent, elongated legs are deflected sufficiently so that the resulting force being applied by said legs on said appendages in the selected direction results in the object being firmly held between said clamping edge and said stop means after the object is inserted therebetween.

6. A quick release clamping mechanism in accordance with claim 5, wherein said cam surfaces of said appendages associated with said clamping member are in a mutually opposed, facing relationship:

wherein said spring means are two wire springs formed so as to have in each spring in addition to one of said independent, elongated, resilient legs both a generally semicircular, spring securing leg and a free-end leg;

wherein said means for restricting movement of said two wire springs comprises a sectioned ridge extending both downwardly from the underside of the housing and having both front and back surfaces thereof extending along a plane parallel to a plane through said appendages, said ridge being laterally offset from said appendages a distance sufficient for the front side of said ridge adjacent a terminating end of an associated one of each of the free-end legs of said two wire springs to make contact therewith and for front and back sides of said ridge adjacent an associated one of each of said generally semicircular, spring securing legs to be engaged thereby; and wherein both said clamping edge of said clamping member and said stop means are in the form of a bezel edge.

References Cited

UNITED STATES PATENTS

| | | | |
|---|---|---|---|
| 1,299,866 | 4/1919 | Smith | 220—55 |
| 1,988,360 | 1/1935 | Moore | 220—55 |
| 2,315,455 | 3/1943 | Sale | 292—175 |

MARVIN A. CHAMPION, *Primary Examiner.*

J. R. MOSES, *Assistant Examiner.*